United States Patent
Frederiksen

(10) Patent No.: US 8,166,372 B2
(45) Date of Patent: Apr. 24, 2012

(54) BLIND ESTIMATION OF CONTROL CHANNEL

(75) Inventor: Frank Frederiksen, Klarup (DK)

(73) Assignee: Nokia Corporation, Espoo (FI)

( * ) Notice: Subject to any disclaimer, the term of this patent is extended or adjusted under 35 U.S.C. 154(b) by 1074 days.

(21) Appl. No.: 11/647,423

(22) Filed: Dec. 29, 2006

(65) Prior Publication Data

US 2008/0163002 A1    Jul. 3, 2008

(51) Int. Cl.
*H03M 13/00* (2006.01)

(52) U.S. Cl. .................. 714/774; 714/768; 714/786

(58) Field of Classification Search ................ 714/774, 714/768, 772, 776, 779, 786, 758; 375/295
See application file for complete search history.

(56) References Cited

U.S. PATENT DOCUMENTS

| | | | | |
|---|---|---|---|---|
| 5,963,596 A * | 10/1999 | Benbassat et al. | ............ | 375/243 |
| 6,438,115 B1 * | 8/2002 | Mazur et al. | .................. | 370/330 |
| 6,532,563 B2 * | 3/2003 | Nobelen | ........................ | 714/751 |
| 6,985,726 B2 * | 1/2006 | Ahmed et al. | ............. | 455/432.2 |
| 7,289,574 B2 * | 10/2007 | Parolari | ........................ | 375/295 |
| 7,406,077 B2 * | 7/2008 | Balasubramanian et al. | | 370/391 |
| 7,430,257 B1 * | 9/2008 | Shattil | ............................ | 375/347 |
| 7,643,423 B2 * | 1/2010 | Chillariga et al. | ............ | 370/235 |

FOREIGN PATENT DOCUMENTS

| | | |
|---|---|---|
| EP | 1 300 976 A1 | 4/2003 |
| KR | 1020030080000 A | 10/2003 |
| WO | 02/065720 A1 | 8/2002 |

OTHER PUBLICATIONS

Korean Office Action, Korean Patent Application No. 2009-7015984, Date: Jan. 19, 2011, pp. 1-4, English Translation: pp. 1-2.
520000368439, Notice of Final Rejection, Sep. 16, 2011 (Translation attached0.

* cited by examiner

*Primary Examiner* — Fritz Alphonse
(74) *Attorney, Agent, or Firm* — Squire Sanders (US) LLP

(57) ABSTRACT

A method, system, apparatus, and computer program product for decoding control information, wherein a total number of allocation blocks defining control channels to be allocated to users for at least one of uplink and downlink directions is determined. Then, a format which determines resource allocation within allocation blocks is selected, allocation blocks are decoded using the selected format, and an error checking is performed for the decoded allocation blocks. This selecting, coding and error checking is repeated for different available formats until no error is revealed in said error checking. Thereby, a blind estimation of a format chosen for the control channel information can be achieved, so that additional amount of control signalling can be reduced.

23 Claims, 2 Drawing Sheets

BLIND ESTIMATION OF CONTROL CHANNEL

FIELD OF THE INVENTION

The invention, according to various embodiments, relates to a method, system apparatus, and computer program product for decoding a control information conveyed via a control channel.

BACKGROUND OF THE INVENTION

In wireless communication systems, such as the long term evolution (LTE) of the Universal Mobile Telecommunications System (UMTS) Terrestrial Access Network (UTRAN) in $3^{rd}$ Generation Partnership Project (3GPP), new functionalities or features for data channels, such as fast link adaptation, hybrid automatic repeat request, or fast scheduling in case of high speed downlink packet access (HSDPA), rely on rapid adaptation to changing radio conditions. To implement these features, a control channel is used to carry control information relevant for those terminal devices (or user equipments (UEs) in 3G terminology) for which data is available on the respective channel.

An adaptive modulation and coding concept may be applied to the control channel to expand the dynamic range of the control channel. One of the problems with the power control option is that only a certain dynamic range can be exploited due to hardware limitations.

To support different data rates a range of channel coding rates and different modulation formats may be supported. Hence, at least two formats, e.g., modulation and coding scheme (MCS) formats, may be supported for the control signaling via the control channel. The downlink (DL) control signaling may be located in the first n transmission symbols. Thus, data transmission in DL can at the earliest start at the same transmission symbol as the control signaling ends.

FIG. 3 shows an example of a design of one "mother" control channel out of a plurality of control channels. This mother control channel can be split into some "child" control channels by dividing the physical resources using a variable coding scheme for allocations. In this example, the channel size of a "mother" control channel is 360 channel bits which may correspond to 180 QPSK (quadrature phase shift keying) symbols. However, it is noted that the number of channel bits is a design parameter which may be used to adjust tradeoff between coverage and capacity. In FIG. 3, the upper part shows a case in which one user is allocated to the control channel, while the lower part shows a case in which two users are allocated within the same physical resources, each using a "child" control channel, corresponding to 180 channel bits following the abovementioned example. The control information conveyed via the control channel may be divided into allocation information 42 for the terminal device, a terminal identification 44 (e.g. user equipment identity (UEID), cell-specific radio network temporary identity (C-RNTI) etc.), and an error checking pattern 46 (e.g. cyclic redundancy check (CRC)). It is noted that the terminal identification 44 and the error checking pattern 46 may be merged, such that a terminal or user specific masking of at least a part of the error checking pattern can be achieved.

A problem faced when decoding the control channel is that the receiving end will have to know the size and/or length of the data information being decoded (in order to do channel decoding and error checks) prior to the actual decoding. To illustrate, a situation is assumed where downlink allocation uses 80 bits. In the upper case of a single user and a channel size of 360 channel bits, an effective code rate of about 0.2 (i.e. 80/360=0.22), while in the lower case the effective code rate is increased to about 0.4, by reducing the channel size to 180 bits and still keeping the downlink allocation size to 80 bits. Now, if there are two formats available for the control signaling, the amount of users for downlink using format #1 and format #2, respectively, must be determined in order to know the size of each. The same applies to the allocations for the uplink direction.

This information could be forwarded for example as separate category 0 information (control information for the control channel). However, in the case of having two formats for the control signaling (as described above), at least four numbers are needed to indicate the amount of allocations in each 'size/type' of allocation.

SUMMARY OF SOME EXEMPLARY EMBODIMENTS

A need therefore exists for providing an improved control signaling scheme, by means of which the amount of control information for the control channel can be reduced.

According to an embodiment of the invention, a method comprises:
  determining a total number of allocation blocks defining control channels to be allocated to users for at least one of uplink and downlink directions;
  selecting a format which determines resource allocation within allocation blocks;
  decoding an allocation block using said selected format;
  performing an error checking for said decoded allocation block; and
  repeating said selecting, decoding and error checking for different available formats until no error is revealed in said error checking.

According to another embodiment of the invention, an apparatus comprises
  a determination unit for determining a total number of allocation blocks defining control channels to be allocated to users for at least one of uplink and downlink directions;
  a selection unit for selecting a format which determines resource allocation within allocation blocks;
  a decoding unit for decoding an allocation block using said selected format; and
  an error checking unit for performing an error checking for said decoded allocation block;
  wherein said selection unit, decoding unit, and error checking unit are configured to repeat said selecting, decoding and error checking for different available formats until no error is revealed in said error checking.

According to a further embodiment of the invention, a network device is configured to decide on a total number of allocation blocks defining control channels to be allocated to users for at least one of uplink and downlink directions based on a channel quality of said users, and to provide said decided total number to said users.

Accordingly, a blind estimation of a format chosen for the control channel information can be achieved, so that additional amount of control signaling can be reduced.

The selection of the format may be started with the most robust format and remaining formats may be selected in the order of robustness.

In an embodiment, the total number of allocation blocks may comprise receiving an information indicating the total number of allocation blocks as a control information for the control channel.

Additionally, the error checking may be achieved by checking a cyclic redundancy code provided in the allocation blocks. As an additional option, error checking may comprise identifying a user- or terminal-specific identification. This identifying may be based on a terminal identity.

In an optional final step, correctness of the obtained allocation may be checked or tested.

Further advantageous modifications are defined in dependent claims.

BRIEF DESCRIPTION OF THE DRAWINGS

The invention will now be described based on embodiments with reference to the accompanying drawings in which.

DESCRIPTION OF THE EMBODIMENT

In the following, various embodiments of the invention will be described based on a wireless transmission system, such as UTRAN.

Figure 1:
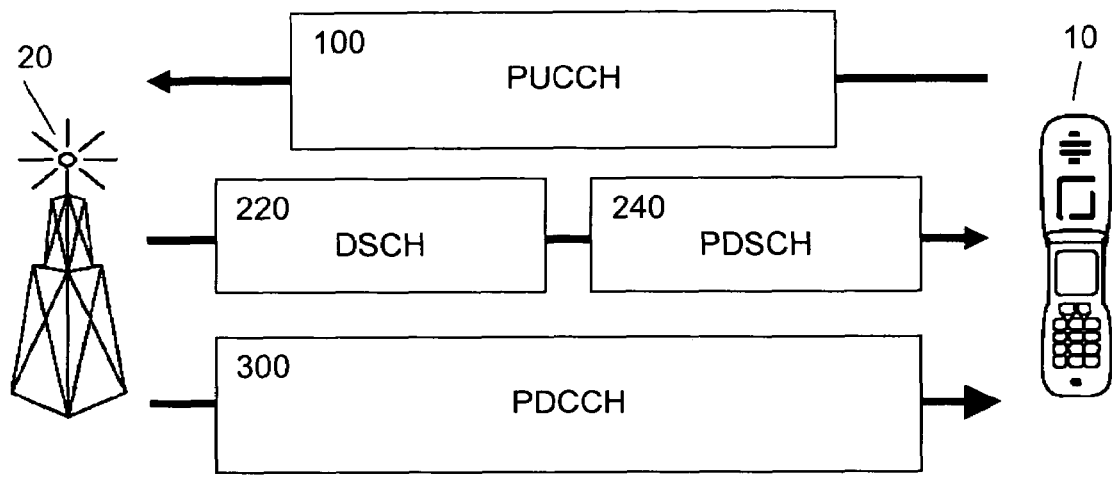
FIG. 1 shows a schematic diagram indicating channels used for communication in an enhanced wireless network.

FIG. 1 shows a schematic diagram of a general network and channel architecture in which the invention, in an exemplary embodiment, can be implemented. A radio access network provides access to a UE 10 via an access device 20, e.g., a base station device, a node B, or an access point, having a scheduler functionality for scheduling resources by allocating resource blocks to users which are currently connected to the access network. Data and control signaling is performed using specific channels indicated in FIG. 1 and based on 3GPP specification TS36.211.

A DL shared channel (DSCH) 220 is provided as a shared transport channel, which means that as more users join the network, bandwidth is further divided among each user. This is similar to the way that cable modems allocate bandwidth. Fast scheduling shares the DSCH 220 among the users. This exploits multiuser diversity and allocates more bandwidth to users with more favorable radio conditions. A scheduler can base its decisions for example on predicted channel quality, the current load of the cell and the traffic priority class (real-time or non-real-time services). Additionally, a physical downlink shared channel (PDSCH) 240 is provided as a physical channel for carrying high-speed data to users. Feedback information (e.g. acknowledgements, channel information etc.) in the uplink (UL) direction from the UE 10 to the access device 20 is signaled via a dedicated physical control channel (DPCCH) 100.

Additionally, a physical downlink control channel (PDCCH) 300 is provided as a shared physical signalling channel to convey control information for multiple users and used to set up the above PDSCH 240 or to perform hybrid automatic repeat request (HARQ) signaling.

Fast link adaptation enables the use of more spectrally efficient modulation when channel conditions permit. With favorable channel conditions 16 quadrature amplitude modulation (QAM) may be used for example, while QPSK may be used when unfavorable or less favorable channel conditions are faced.

Additionally, the coding rate may be adapted, wherein a coding rate of 1/4 means that error correction and detection takes 75 percent of the bandwidth and the user data rate is only 25 percent of the maximum. Likewise, a coding rate of 4/4 means that the user achieves the maximum data rate, but there is no error correction, and therefore there will be many errors in the received data.

As an additional measure, adaptive modulation and coding (AMC) schemes may be used for link adaptation. These schemes enable the system to change the coding and modulation schemes. The channel condition has to be measured or estimated based on the feedback of the receiving end. Links with better transmission conditions can be assigned a higher order modulation scheme and higher coding rates. The benefits of AMC include availability of high data throughput, low interference variation because it is based on modulation and coding-based link adaptation instead of variations in transmit power, and high effectiveness.

Link adaptation is the process of modifying transmission parameters to adapt to the current channel parameters. Higher order modulation, in conjunction with channel coding, optimizes the use of a fading radio channel. By transmitting at constant power, the modulation and coding schemes (MCS) can be selected to maximize throughput on the downlink direction. A media access control (MAC) layer functionality at the access device selects the MCS that matches the instantaneous radio conditions depending on a shortened transmission time interval (TTI). The MCS selection may depend on for example channel quality indication, instantaneous power of the associated dedicated physical channel, quality of service (QoS) demands of the requested service, or waiting buffer sizes.

In an embodiment, a limit is put on the MCS format settings for the physical downlink control channel PDCCH 300 such that it is only possible to fit an integer number of allocations within a fixed number of sub-carriers. That is, basically, a known number of sub-carriers are reserved for each allocation for downlink, and another number of sub-carriers are reserved for each uplink allocation. Then, if a user being allocated is in a poor channel condition, the MCS will be set such that all sub-carriers will be used for this user. That is, the mother control channel is fully allocated to this user. If the channel conditions for other users are such that two or more users will fit within the mother control channel (i.e. 'block' of sub-carriers), it will be split into child control channels, so that these users will share the allocation block of the mother control channel, while separate coding may still be used for each user so that they use a less robust MCS for their resource allocation information.

Hence, a full control channel defined by a number of sub-carrier symbols reserved for this control channel can be split into a plurality of mother control channels (i.e. allocation blocks) for uplink and downlink allocations. The single mother control channel can then individually be split into child control channels shared by different users (resource allocation).

Figure 2:
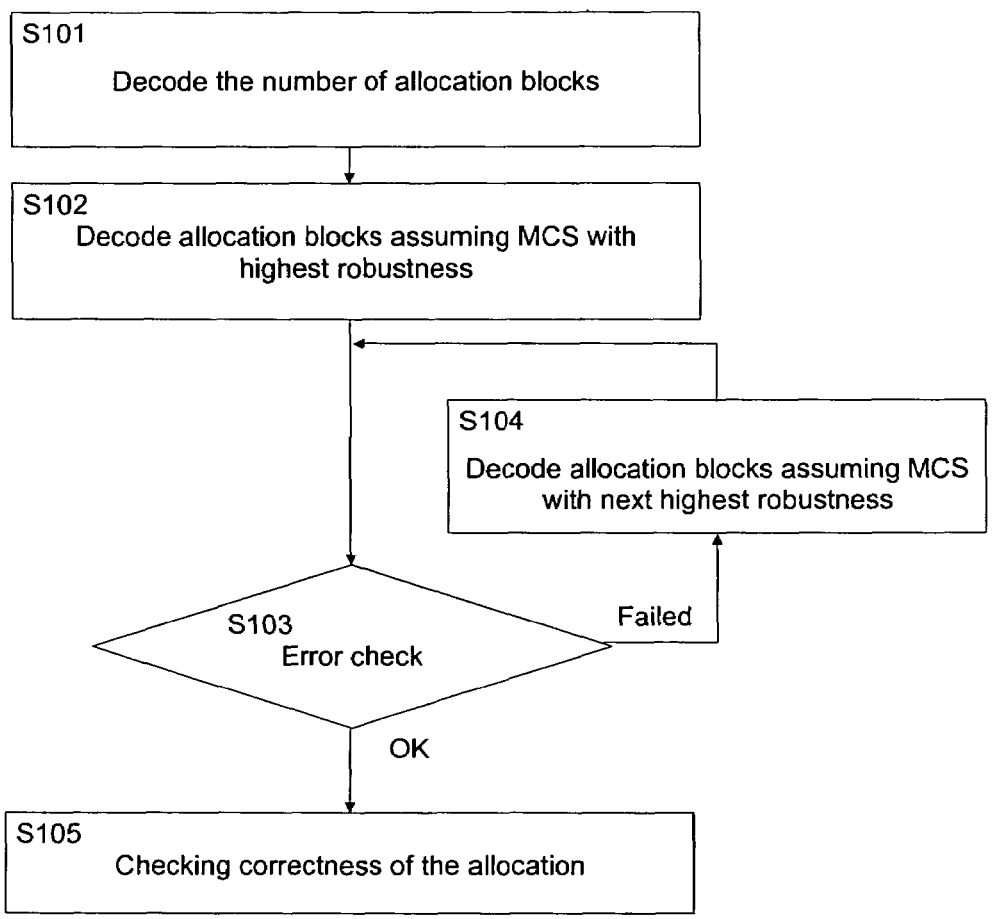
FIG. 2 shows a schematic flow diagram of a decoding procedure according to an embodiment.

FIG. 2 shows a schematic flow diagram of a decoding procedure for the PDCCH 300 which can be implemented at the UE 10. In step S101, the number of allocation blocks (i.e. mother control channels) for uplink and downlink are decoded or determined, e.g., from a control information (e.g., so-called "category 0" or "Cat0" information provided as a control information for the PDCCH 300). As an alternative option, the number of allocation blocks may be known or derived from a system parameter. This number of allocation blocks may be decided and signaled by the network (e.g., base station device such as a serving node B, or other access device) using e.g. on-the-fly signalling or a cell-specific parameter. The decision on the mapping of scheduled UEs (i.e. which UE needs how many allocation blocks, e.g., subcarrier symbols) may be made based on a measured or received channel quality of each UE.

Then, in step S102, all allocation blocks are tried to be decoded assuming for example the most robust MCS. In step S103, an error check is performed, such as for example a test for a correct CRC for the allocation blocks. Optionally, it may be searched for a resource allocation intended for the concerned user, e.g., through the UEID or any other terminal or user identification.

If the checking in step S103 reveals that the decoding was erroneous (e.g. situations where the check of the CRC fails), the procedure branches off to step S104 in order to repeat the decoding operation of the allocation blocks for a second MCS e.g. with next highest robustness (e.g. new decoding procedure and/or other decoding). Then, the error check in step S103 is repeated.

Figure 3:
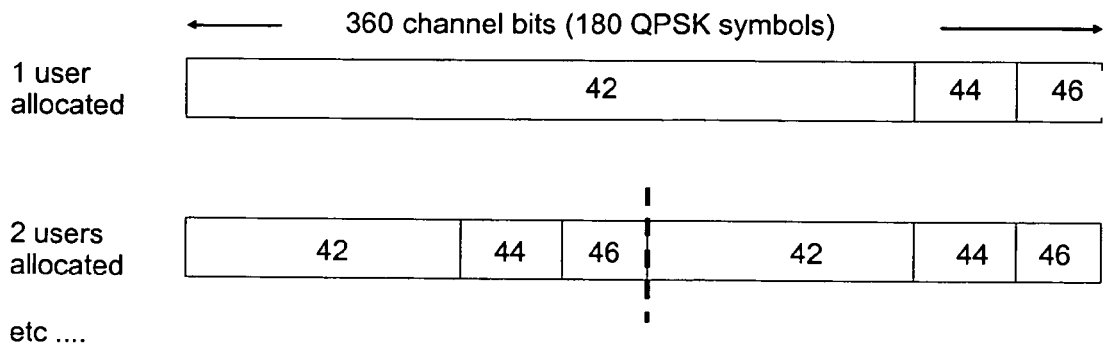
FIG. 3 shows an example of a control channel design using variable coding schemes.

If the result is again negative (error check failed), the processing loop is repeated in the same way for all the possible levels of MCS for the shared control channel. As soon as a no error is determined in step S103, the procedures continues with step S105, where correctness of the derived allocation may be checked as an optional verification measure. Step S105 provides a mechanism that allows the UE 10 to test whether the allocation is feasible or not. This checking may be achieved by adding an additional verification information to the allocation blocks shown in FIG. 3. As an alternative, the information obtained from the above decoding process may be directly used for respective processing operations at the UE 10 without prior verification in step S105.

Figure 4:
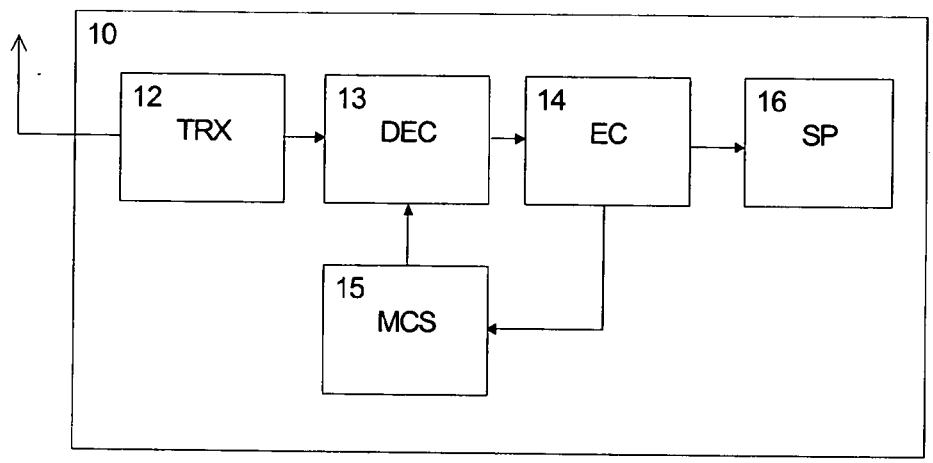
FIG. 4 shows a schematic block diagram of a decoding apparatus according to an embodiment.

FIG. 4 shows a schematic block diagram of the UE 10 according to an embodiment, which is however limited to those functionalities involved in the present invention. Other functionalities have been omitted for reasons of clarity and brevity.

The UE 10 comprises a radio frequency transceiver unit 12 for transmitting and receiving information by using the above channels mentioned in connection with FIG. 1. The data or information stream received via the PDCCH 300 is supplied to a decoding function or unit 13 which is configured to decode the number of allocation blocks for uplink and downlink, e.g., from a control information for the PDSCCH 300 as mentioned above. Based on this information, the decoding unit 13 decodes all allocation blocks using an MCS selected by an MCS selection function or unit 15. Available MCS types or patterns may be stored at the MCS selection unit 15 or a separate memory or look-up table (not shown). The decoding result is supplied to an error checking function or unit 14 where an error check is performed as explained in the above step S103 of FIG. 2. If the checking at the error checking unit 14 leads to the result that the decoding was erroneous, a corresponding error indication is supplied to the MCS selection unit 15, which then selects a new MCS and initiates a new decoding and error checking operation at the respective units 13 and 14. If the output of the error checking unit 14 indicates successive decoding without any error or failure, the resulting allocation is processed in a signal processing function or unit 16. This signal processing unit 16 may be configured to initiate the above verification step S105 in FIG. 2.

Consequently, as the proposed decoding procedure and apparatus according to the embodiments enables blind estimation of the chosen MCS for the control signalling via the shared control channel, the amount of separate control information (e.g. Cat0 information) can be reduced.

Figure 5:
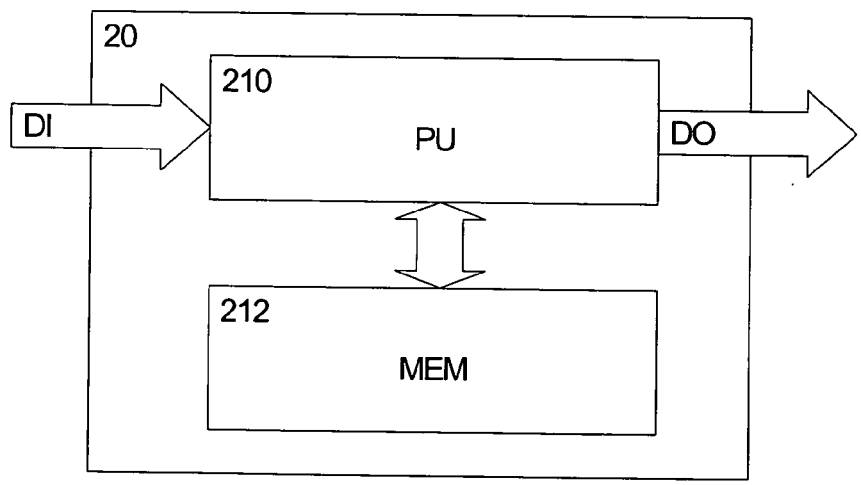
FIG. 5 shows a schematic block diagram of a computer-based implementation according to an embodiment.

FIG. 5 shows a schematic block diagram of a software-based implementation of the proposed advanced decoding procedure. Here, the UE 10 of FIGS. 1 and 4 comprises a processing unit 210, which may be any processor or computer device with a control unit which performs control based on software routines of a control program stored in a memory 212. Program code instructions are fetched from the memory 212 and are loaded to the control unit of the processing unit 210 in order to perform the processing steps of the above functionalities described in connection with FIG. 2 or with the respective blocks 13 to 15 of FIG. 4. These processing steps may be performed on the basis of input data DI and may generate output data DO, wherein the input data DI may correspond to the received control information of the PDCCH 300 and the output data DO may correspond to the decoded allocation information. Consequently, the invention may be implemented as a computer program product comprising code means for generating each individual step of the decoding procedure according to the embodiment when run on a computer device or data processor.

In summary, a method, system, apparatus, and computer program product for decoding control information have been described, wherein a total number of allocation blocks defining control channels to be allocated to users for at least one of uplink and downlink directions is determined. Then, a format which determines resource allocation within allocation blocks is selected, allocation blocks are decoded using the selected format, and an error checking is performed for the decoded allocation blocks. This selecting, decoding and error checking is repeated for different available formats until no error is revealed in said error checking. Thereby, a blind estimation of a format chosen for the control channel information can be achieved, so that additional amount of control signalling can be reduced.

It is apparent that the invention can easily be extended to any kind of control channel where adaptive coding or modulation or other types of formats are used. Any pattern or sequence may be used for selecting and testing available types of formats. The described embodiments are related to control signaling via wireless channels. However, the invention, according to various embodiments, can be applied to control signaling via wired channels as well. Additionally, the invention can be applied to any device, apparatus, module or integrated chip where a control information is to be decoded. Exemplary embodiments may thus vary within the scope of the attached claims.

The invention claimed is:

1. A method comprising:
    determining, using a determining unit, a total number of allocation blocks defining control channels to be allocated to users for at least one of uplink and downlink directions;
    selecting, using a selector, a format which determines resource allocation within allocation blocks;
    decoding, using a decoder, an allocation block using said selected format;
    performing, using a error checking unit, an error checking for said decoded allocation block; and
    repeating said selecting, decoding and error checking for different available formats until no error is revealed in said error checking.

2. The method according to claim 1, wherein said selecting said format comprises starting with the most robust format and selecting remaining formats in the order of robustness.

3. The method according to claim 1, wherein said determining said total number of allocation blocks comprises receiving an information indicating said total number of allocation blocks as a control information for said control channel.

4. The method according to claim 1, wherein said error checking comprises checking a cyclic redundancy code provided in said allocation blocks.

5. The method according to claim 1, wherein said error checking comprises identifying a user- or terminal-specific identification.

6. The method according to claim 5, wherein said identifying is performed based on a terminal identity.

7. The method according to claim 1, further comprising checking correctness of the obtained allocation.

8. An apparatus, comprising:
a processor; and
a memory including computer program code,
the memory and the computer program code configured to, with the processor, cause the apparatus at least to
determine a total number of allocation blocks defining control channels to be allocated to users for at least one of uplink and downlink directions;
select a format which determines resource allocation within allocation blocks;
decode an allocation block using said selected format; and
perform an error checking for said decoded allocation block;
wherein the memory and the computer program code are configured to, with the processor, cause the apparatus to repeatedly select the format, decode the allocation block and perform the error checking for different available formats until no error is revealed when performing said error checking.

9. The apparatus according to claim 8, wherein the memory and the computer program code are configured to, with the processor, cause the apparatus at least to select the most robust format and then select remaining formats in the order of robustness.

10. The apparatus according to claim 8, wherein the memory and the computer program code are configured to, with the processor, cause the apparatus at least to receive an information indicating said total number of allocation blocks as a control information for said control channel.

11. The apparatus according to claim 8, wherein the memory and the computer program code are configured to, with the processor, cause the apparatus at least to check a cyclic redundancy code provided in said allocation blocks.

12. The apparatus according to claim 8, wherein the memory and the computer program code are configured to, with the processor, cause the apparatus at least to identify a user- or terminal-specific identification.

13. The apparatus according to claim 12, wherein the memory and the computer program code are configured to, with the processor, cause the apparatus at least to identify the user- or terminal-specific identification based on a terminal identity.

14. The apparatus according to claim 8, wherein the memory and the computer program code are configured to, with the processor, cause the apparatus at least to check correctness of the obtained allocation.

15. A computer program product embodied on a computer readable storage medium, the computer program product being encoded with instructions to control a processor to perform a process, the process comprising:
determining a total number of allocation blocks defining control channels to be allocated to users for at least one of uplink and downlink directions;
selecting a format which determines resource allocation within allocation blocks;
decoding an allocation block using said selected format;
performing an error checking for said decoded allocation block; and
repeating said selecting, decoding and error checking for different available formats until no error is revealed in said error checking.

16. A system comprising a first apparatus according to claim 8 and a second apparatus for transmitting a control information via said control channel to said first apparatus.

17. The system according to claim 16, wherein said second apparatus is configured to transmit to said first apparatus an information indicating said number of allocation blocks as a control information for said control channel.

18. A user equipment, comprising:
a determination unit configured to determine a total number of allocation blocks defining control channels to be allocated to users for at least one of uplink and downlink directions;
a selection unit configured to select a modulation and coding scheme format which determines resource allocation within allocation blocks;
a decoding unit configured to decode an allocation block using said selected modulation and coding scheme format; and
an error checking unit configured to perform an error checking for said decoded allocation block;
wherein said selection unit, decoding unit, and error checking unit are configured to repeatedly select, decode and perform for different available modulation and coding scheme formats until no error is revealed in said error checking.

19. A receiver module comprising an apparatus according to claim 8.

20. An integrated circuit comprising an apparatus according to claim 8.

21. An apparatus comprising:
determining means for determining a total number of allocation blocks defining control channels to be allocated to users for at least one of uplink and downlink directions;
selecting means for selecting a format which determines resource allocation within allocation blocks;
decoding means for decoding an allocation block using said selected format; and
error checking means for performing an error checking for said decoded allocation block;
wherein said selecting, decoding, and error checking means are configured to repeat said selecting, decoding and error checking for different available formats until no error is revealed in said error checking.

22. A network device configured to
decide on a total number of allocation blocks defining control channels to be allocated to a mobile device for at least one of uplink and downlink directions based on a channel quality of said mobile device, and
provide said decided total number of allocation blocks to said mobile device to repeatedly select a format which determines resource allocation within allocation blocks, decode an allocation block using said selected format, and perform an error checking for said decoded allocation block for different available formats until no error is revealed when performing said error checking.

23. A network device according to claim 22, wherein said network device is a base station device.

* * * * *